United States Patent
Boshell et al.

[11] Patent Number: 5,499,494
[45] Date of Patent: Mar. 19, 1996

[54] LAWN MOWER DISCHARGE CHUTE

[75] Inventors: Gregory A. Boshell, Orangeburg; Charles R. Sagraves, Columbia, both of S.C.

[73] Assignee: White Consolidated Industries, Inc., Cleveland, Ohio

[21] Appl. No.: 97,079

[22] Filed: Jul. 23, 1993

[51] Int. Cl.⁶ .................................................. A01D 34/70
[52] U.S. Cl. .......................................... 56/320.1; 56/320.2
[58] Field of Search ........................... 56/1, 17.3, 17.4, 56/320.1, 320.2, DIG. 20, DIG. 24

[56] References Cited

U.S. PATENT DOCUMENTS

| | | | |
|---|---|---|---|
| 4,258,539 | 3/1981 | Pearce et al. | 56/320.2 |
| 5,003,757 | 4/1991 | Hill | 56/320.2 X |
| 5,195,311 | 3/1993 | Holland | 56/320.2 |
| 5,251,430 | 10/1993 | Matsumoto et al. | 56/320.2 X |

FOREIGN PATENT DOCUMENTS 106617  7/1965  Norway ............................. 56/320.2

*Primary Examiner*—Ramon S. Britts
*Assistant Examiner*—James A. Lisehora
*Attorney, Agent, or Firm*—Pearne, Gordon, McCoy & Granger

[57] ABSTRACT

A lawn mower discharge chute door is vertically hinged. A forward and rear camming surface cam the door shut when an obstacle is encountered in either a forward or rearward direction. The door is contoured on its inner surface to match the aerodynamic interior surface of the deck when it is in a closed mulching position.

18 Claims, 4 Drawing Sheets

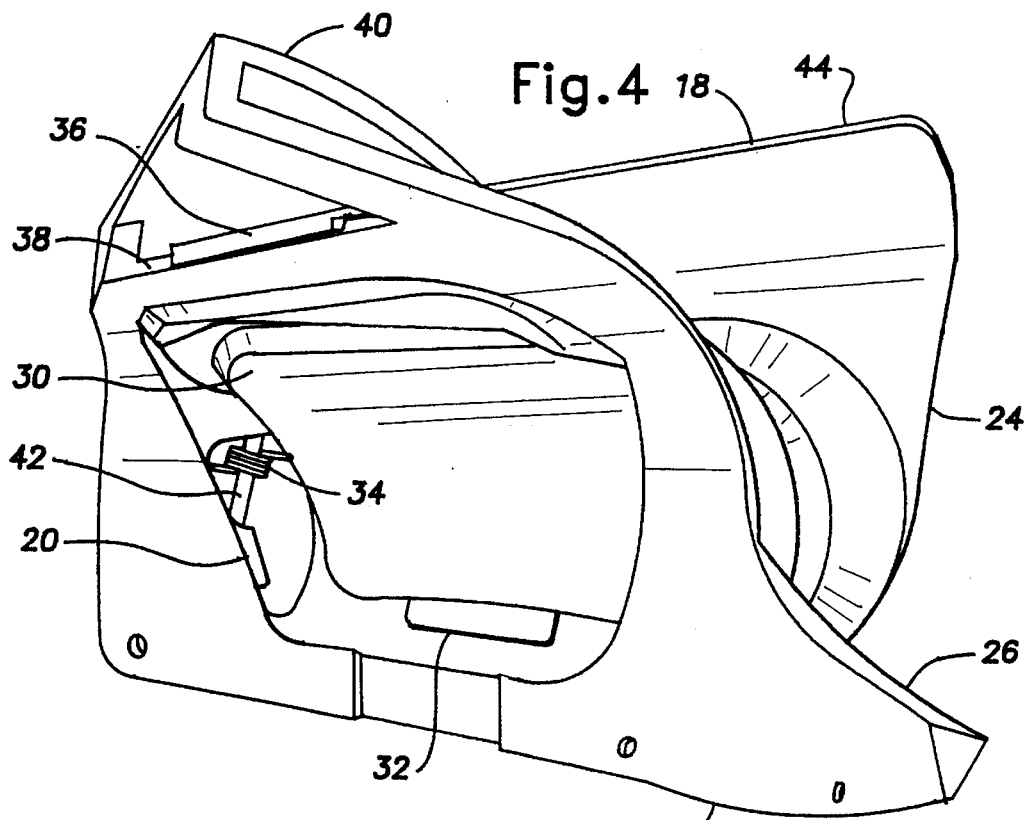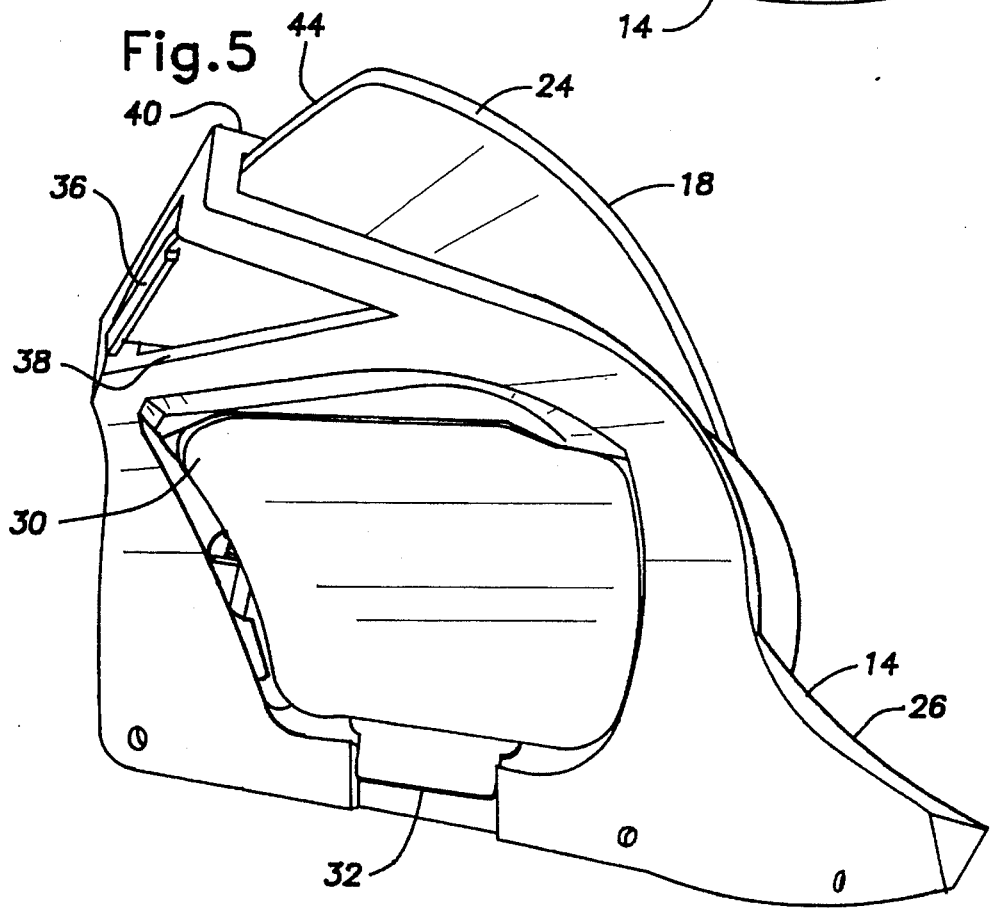

LAWN MOWER DISCHARGE CHUTE

BACKGROUND OF THE INVENTION

The invention relates generally to a mowing device such as a lawn mower/tractor and in particular to a movable deflector or discharge door therefor.

Lawn tractors and lawn mowers often have a side-located discharge port for the debris cut/vacuumed by a rotating blade or other cutters. This discharge port normally communicates with a chute or deflector extending from the side of the machine that directs the debris downward, outward and away from the operator.

During the mowing process, this extending chute often interferes with stationary obstacles located close to the discharge port side of the mower. This prevents the operator from mowing close to these obstacles.

It is known to have a door-like chute hinged so that the chute or door pivots rearward when an obstacle to forward movement is encountered by the door. This causes the door to shut at least partially to allow the mower to mow closely to the obstacle.

It is often also desirable to pass closely to an obstacle when the tractor or mower is moving in a rearward direction. Heretofore, such a hinged door has interfered with obstacles to rearward movement at least as much as a fixed door.

It has also become desirable for a mower to be able to mulch as well as being able to discharge debris from the side. To provide satisfactory mulching, it is not only important that the mower finely comminute the grass, but also that the debris be spread evenly or hidden within the body of the grass.

It is known to have "mulching" mowers that can be converted to side discharge by opening a door to a side discharge port. These doors tend to result in clumping of the debris with resulting poor hiding because the door disturbs the airflow patterns in the deck, not only when open, but also when closed.

SUMMARY OF THE INVENTION

The present invention provides a discharge door for a mower that allows mowing closely to obstacles in both forward and rearward directions. In the closed position the door preserves the smooth airflow necessary for good hiding of debris.

The mower has an aerodynamically contoured interior and a side discharge port from the interior. The port has a leading portion and a trailing portion.

The door includes an attaching structure for pivotably attaching the door to the mower near the port leading portion. The door has a leading camming surface for pivoting the door from an open position to an obstacle-clearing position in response to the leading camming surface contacting an obstacle to forward movement of the mower.

The door has a trailing camming surface for pivoting the door from the open position to the obstacle-clearing position in response to the trailing camming surface contacting an obstacle to rearward movement of the mower.

In the preferred embodiment, the door has an inner surface matching the aerodynamic contoured interior of the mower and provides a continuation thereof when the door is in a closed obstacle-clearing position.

In the preferred embodiment, a door guard is attached to the mower near the port top portion. The guard cooperates with the door to limit an upward movement of said door.

BRIEF DESCRIPTION OF THE DRAWINGS

FIG. 4 is a perspective view of a door and guard according to the invention with the door in the open position.

FIG. 5 is a perspective view of a door and guard according to the invention with the door in the closed position.

DESCRIPTION OF THE PREFERRED EMBODIMENT

Figure 1:
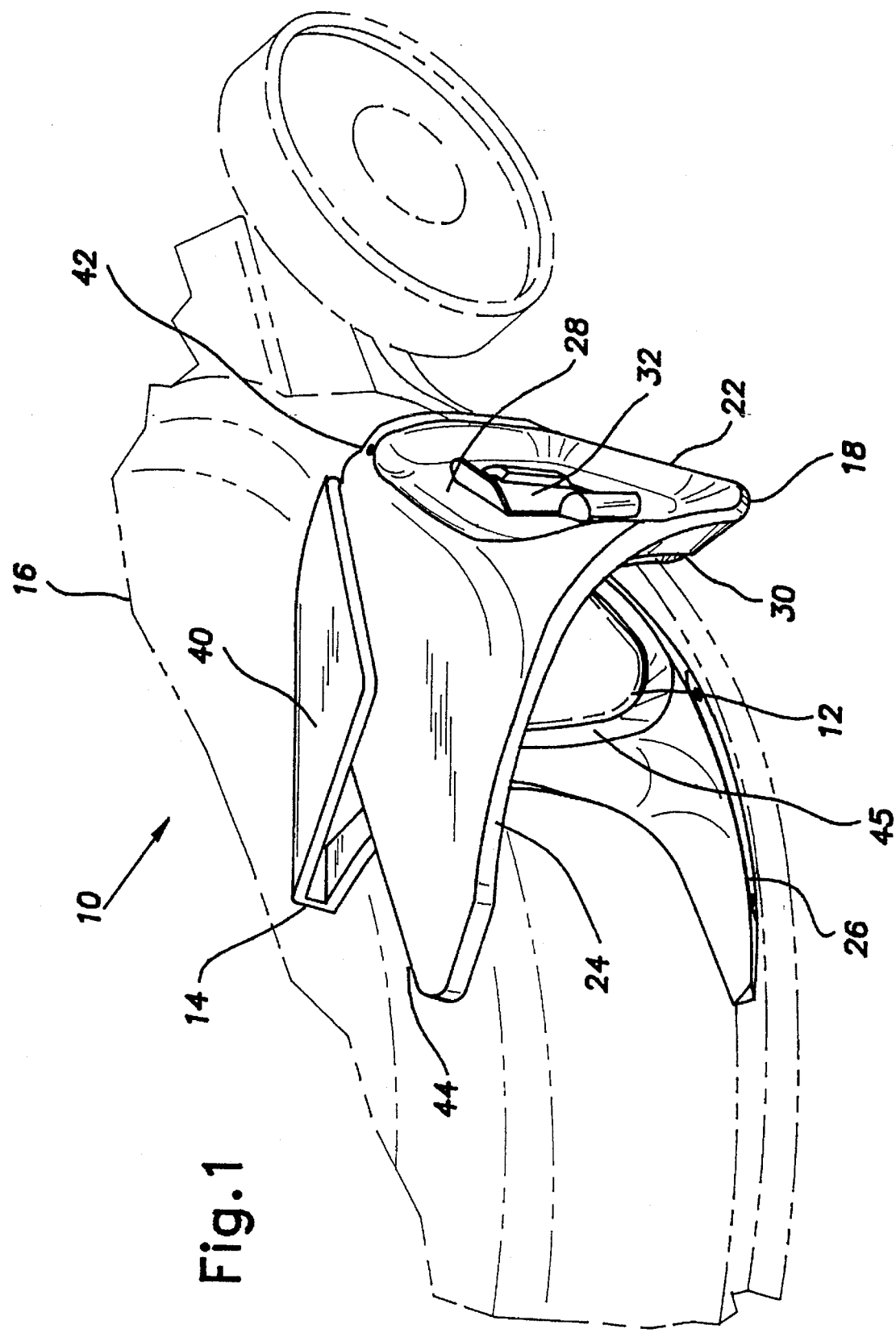
FIG. 1 is a partial perspective view of a lawn mower according to the invention.

Referring to FIG. 1, a lawn mower 10 has a side discharge port 12. A guard 14 is attached to the mower deck 16 about the port 12. A door 18 is hinged to the guard 14 by a hinge 20 (FIG. 4).

The guard 14 and the door 18 may be, for example, composed of thermoplastic and the deck 16 of steel. The guard 14 may be, for example, attached to the deck 16 with fasteners or adhesive may be used. It is also possible, for example, to form the guard 14 and the deck 16 in one piece.

The door 18 has a leading camming surface 22 and a trailing camming surface 24. A trailing guide 26 is located to the rear of the port 12, near the bottom of the deck 16.

The door 18 has a generally vertical recessed outer area 28 and a roughly corresponding protruding inner area 30.

A sliding lock plate 32 is retained by friction in the door 18. The plate 32 extends through the bottom edge of the door 18 (FIG. 4). When fully extended, the plate 32 can engage the guard 14 to lock the door 18 in the closed position (FIG. 5).

Referring to FIGS. 4 and 5, the door 18 is biased toward an open position by a torsion spring 34. In the preferred embodiment, the hinge 20 is oriented so that the door 18 swings slightly down as it opens.

The upper surface of the door 18 has a stop 36 which engages a stop 38 in the guard 14. The stop 38 may be, for example, formed from a cut out area in the guard 14. The stops 36, 38 limit the opening travel of the door 18.

A portion 40 of the guard 14 is cantilevered over the door 18. The portion 40 acts to retain the stop 36 within the guard 14. Additionally, the portion 40 reinforces the door 18 against upward movement of the door 18. The door stop 36 may be advantageously snap-fitted into the guard 14.

A hinge pin 42 may be inserted through the door 18 to form the pivot for the hinge 20.

Figure 6:
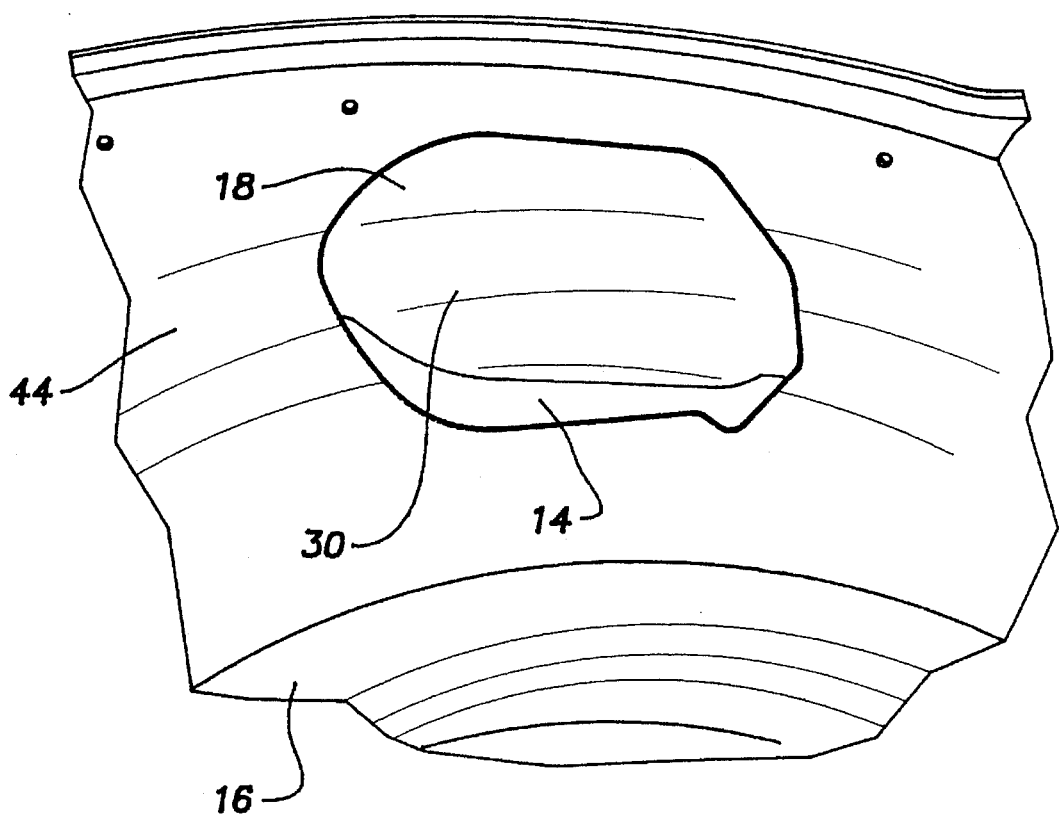
FIG. 6 is a partial perspective view from below of the inside of the mower deck showing a door according to the invention in the closed position.

Referring to FIG. 6, the inner area 30 of the door 18 is made such that in the closed position of the door 18, the area 30 protrudes into the port 12 so that the door 18 matches and completes the aerodynamic contoured interior 44 of the deck 16.

Referring to FIG. 1, the guard 14 has a surface 45 directed to the side and rear of the mower 10.

When operating in a side-discharge mode, the mower 10 exhausts debris from the port 12. The debris strikes the inner surfaces of the door 18 and is directed generally downward.

The surface 45 of the guard 14 acts to direct the debris more to the side and less toward the operator.

Figure 2:
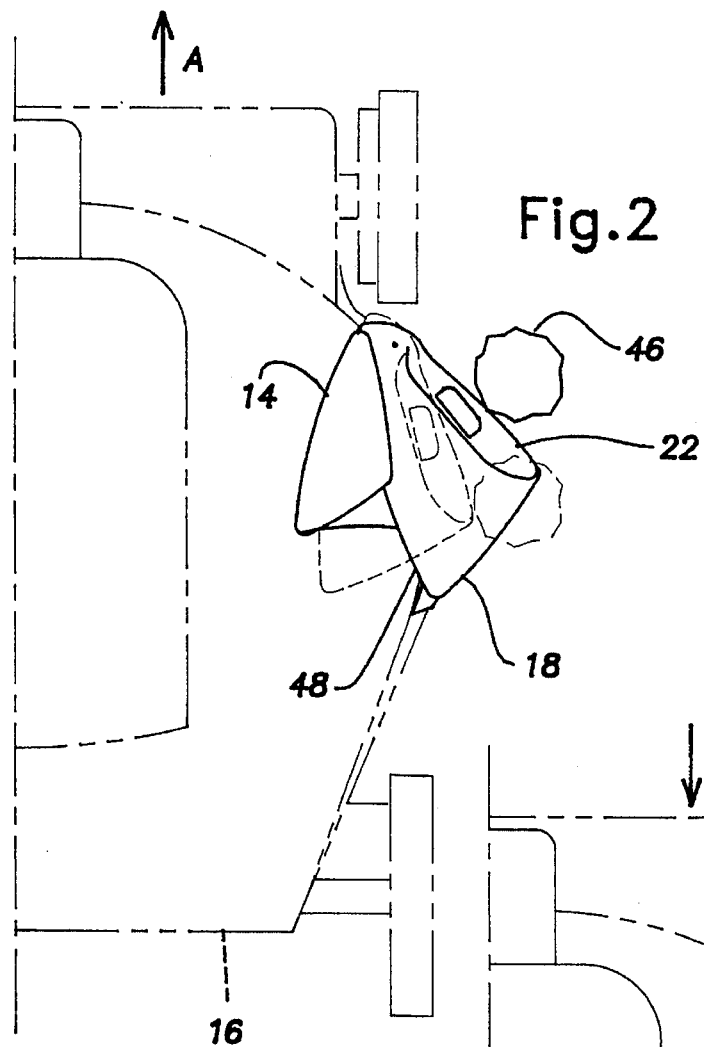
FIG. 2 is a partial top plan view of a lawn mower according to the invention striking an obstacle in the forward direction.

Referring to FIG. 2, during operation of the mower 10 in a forward direction A, an obstacle 46 may come in contact with the door 18. The leading camming surface 22 slides against the object 46 camming the door 18 closed a sufficient amount to clear the obstacle 46 as indicated in phantom.

Figure 3:
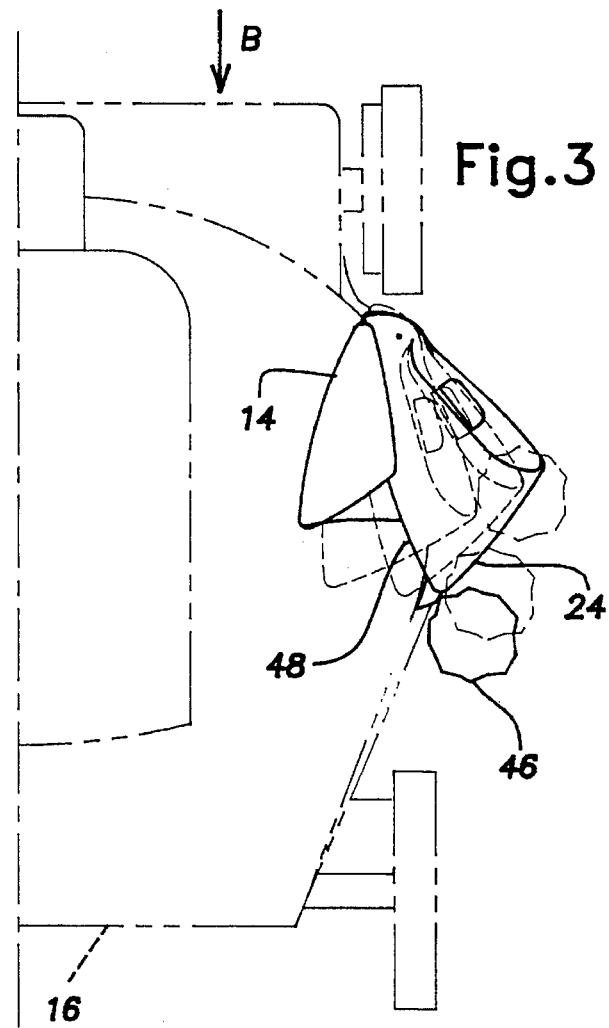
FIG. 3 is a partial top plan view of a lawn mower according to the invention striking an obstacle in the rearward direction.

Referring to FIG. 3, during operation of the mower 10 in a rearward direction B, an obstacle 46' may come in contact with the door 18. The trailing camming surface 24 slides against the object 46' camming the door 18 closed a sufficient amount to clear the obstacle 46' as indicated in phantom.

In some cases, the obstacle 46' may be close enough to the deck 16 that the guide 26 contacts the object 46' before the door 18. The guide 26 guides the path of the object/mower so that the object 46' contacts the camming surface 46' rather than the edge 48 of the door 18.

When mulching is desired, the door 18 may be locked in the closed position (FIGS. 5 and 6) with the lock plate 32. Because the surface 30 of the door 18 matches the aerodynamic interior 44 of the deck 16, hiding of the debris is accented.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A discharge door for a mower having an aerodynamically contoured interior and a side discharge port from said interior, said port having a leading portion and a trailing portion, said door comprising:
   an attaching structure for pivotably attaching said door to said mower near said port leading portion, said structure including a pivot;
   a leading camming surface for pivoting said door from an open position to an obstacle-clearing position in response to said leading camming surface contacting an obstacle to forward movement of said mower; and
   a trailing camming surface for pivoting said door from said open position to said obstacle-clearing position in response to said trailing camming surface contacting an obstacle to rearward movement of said mower, said trailing camming surface being at a decreasing distance from the pivot in a direction away from said mower.

2. A door according to claim 1, further comprising a door lock, said lock being operable to lock said door in a closed obstacle-clearing position.

3. A door according to claim 1, wherein said door has an inner surface matching said aerodynamic contoured interior of said mower and provides a continuation thereof when said door is in a closed obstacle-clearing position.

4. A mower comprising:
   an aerodynamically contoured interior having a side discharge port from said interior, said port having a leading portion, a trailing portion, an upper portion and a lower portion; and
   a door, said door having:
      an attaching structure for pivotably attaching said door to said mower near said port leading portion, said structure including a pivot;
      a leading camming surface for pivoting said door from an open position to an obstacle-clearing position in response to said leading camming surface contacting an obstacle to forward movement of said mower; and
      a trailing camming surface for pivoting said door from said open position to said obstacle-clearing position in response to said trailing camming surface contacting an obstacle to rearward movement of said mower, said trailing camming surface being at a decreasing distance from the pivot in a direction away from said mower.

5. A mower according to claim 4, wherein said door further comprises a door lock, said lock being operable to lock said door in a closed obstacle-clearing position.

6. A mower according to claim 5, wherein said door lock lockably engages said port lower portion.

7. A mower according to claim 4, wherein said door has an inner surface matching said aerodynamic contoured interior of said mower and provides a continuation thereof when said door is in a closed obstacle-clearing position.

8. A mower according to claim 4, further comprising a biasing device to urge said door towards said open position.

9. A mower according to claim 4, further comprising a door guard, said door guard being attached to said mower near said port top portion, said guard cooperating with said door to limit an upward movement of said door.

10. A mower according to claim 9, wherein said door guard and door include cooperating stops for limiting said door from pivoting beyond said open position.

11. A mower according to claim 9, wherein said door guard is fixedly attached to said mower and a portion of said door guard cantilevers over a pivoting portion of said door.

12. A mower according to claim 4, further comprising a door guard, said door guard being located about said port, said guard having a surface surrounding said port and flaring outward acting to direct a discharge of debris away from an operator.

13. A mower according to claim 4, further comprising a trailing guide attached to said mower near said lower and trailing port portions, said guide having a surface vertically overlapping with said trailing camming surface and adapted to guide said obstacle to rearward movement of said mower towards said trailing camming surface.

14. A mower comprising:
   an aerodynamically contoured interior having a side discharge port from said interior, said port having a leading portion, a trailing portion, an upper portion and a lower portion;
   a door, said door having:
      an attaching structure for pivotably attaching said door to said mower near said port leading portion, said structure including a pivot;
      a leading camming surface for pivoting said door from an open position to an obstacle-clearing position in response to said leading camming surface contacting an obstacle to forward movement of said mower;
      a trailing camming surface for pivoting said door from said open position to said obstacle-clearing position in response to said trailing camming surface contacting an obstacle to rearward movement of said mower, said trailing camming surface being at a decreasing distance from the pivot in a direction away from said mower; and
      an inner surface matching said aerodynamic contoured interior of said mower and providing a continuation thereof when said door is in a closed obstacle-clearing position;
   a biasing device to urge said door towards said open position; and a door guard located about said port, said guard cooperating with said door to limit an upward movement of said door and having a surface acting to direct a discharge of debris away from an operator.

15. A mower according to claim 14, wherein said door further comprises a door lock, said lock being operable to lock said door in a closed obstacle-clearing position.

16. A mower according to claim 14, wherein said door guard and door include cooperating stops for limiting said door from pivoting beyond said open position.

17. A mower according to claim 14, wherein a portion of said door guard cantilevers over an upper surface of said door.

18. A mower according to claim 14, further comprising a trailing guide attached to said mower near said lower and trailing port portions, said guide having a surface vertically overlapping with said trailing camming surface and adapted to guide said obstacle to rearward movement of said mower towards said trailing camming surface.

* * * * *